US005482303A

United States Patent [19]

Meloy

[11] Patent Number: 5,482,303

[45] Date of Patent: Jan. 9, 1996

[54] CARRIAGE TABLE

[76] Inventor: John Meloy, 820 N. Creek, Dewey, Okla. 74029

[21] Appl. No.: 399,560

[22] Filed: Mar. 7, 1995

[51] Int. Cl.$^6$ .................................. B62B 1/12; B62B 5/00

[52] U.S. Cl. .................................. 280/43.17; 280/43.24; 280/47.24; 280/47.33; 108/50

[58] Field of Search .............................. 280/47.21, 47.24, 280/47.33, 30, 43.17, 43.24, 46, 63, 763.1; 108/50, 116, 162, 176

[56] References Cited

U.S. PATENT DOCUMENTS

| | | | |
|---|---|---|---|
| 1,554,903 | 9/1925 | Beatty . | |
| 1,828,248 | 10/1931 | Hallowell et al. | 280/47.24 |
| 2,489,390 | 11/1949 | Stearns | 214/1 |
| 2,599,170 | 6/1952 | Franks | 248/23 |
| 2,672,349 | 3/1954 | Brock | 280/47.24 X |
| 3,404,884 | 10/1968 | Sorenson et al. | 272/60 |
| 3,578,278 | 5/1971 | Pickering | 248/20 |
| 3,595,115 | 7/1971 | Pelletier | 83/165 |
| 3,740,067 | 6/1973 | Tertinek | 280/43.24 |
| 4,230,329 | 10/1980 | Johnson | 280/43.24 X |
| 4,269,096 | 5/1981 | Boone | 280/43.24 X |
| 4,639,005 | 1/1987 | Birkley | 280/47.21 X |
| 4,971,286 | 11/1990 | Silhan | 248/676 |
| 5,087,013 | 2/1992 | Gress et al. | 248/676 |
| 5,308,094 | 5/1994 | McWhorter et al. | 280/43.24 X |

FOREIGN PATENT DOCUMENTS

| | | | |
|---|---|---|---|
| 735371 | 11/1932 | France | 280/43.17 |
| 538723 | 11/1931 | Germany | 280/43.24 |
| 422717 | 1/1935 | United Kingdom | 280/43.24 |

*Primary Examiner*—Brian L. Johnson

*Attorney, Agent, or Firm*—Molly D. McKay

[57] ABSTRACT

A table for mounting a saw or other woodworking tool which can be easily rolled about and releveled. Retractable arms having handles extending rearward of the table and a pair of wheels extending forward of the table pivotally attach to the table so that when the handles are raised, the wheels pivot downward, causing the table to be lifted off its front legs. The table is provided rearwardly with a horizontal stop member which is engaged by the arms as the handles are further lifted, thereby also lifting the table off its rear legs so that the table can be easily moved about on the wheels. Each leg is provided with a height adjusting rod which extends upward from the lower end of the leg. The table legs rest upon leg supports provided on lower ends of the height adjusting rods. The height of the legs may be independently adjusted by turning the height adjusting rod by grasping and turning a handle provided on an opposite upper end of each height adjusting rod.

17 Claims, 3 Drawing Sheets

CARRIAGE TABLE

BACKGROUND OF THE INVENTION

1. Field of the Invention

The present invention relates to a work table onto which tools of various types may be mounted, such as table saws, grinders, etc. More specifically, the present invention relates to a table which can be moved about freely on wheels pivotally provided on a lower front end of said invention so that the wheels are attached to telescoping handles provided on a rear end of said invention. Said invention may be releveled by means of screw-type mechanisms provided on each leg of the table.

2. Description of the Related Art

Some types of wood working tools, most notably various types of saws and belt sanders, must be mounted onto a table in order for the tools to be used properly. Once a tool has been mounted, the combined weight of the tool and the table make moving the combination difficult. Often the owner of the tools does not have sufficient area in his work shop or garage to permanently position the tools where they will be used, and therefore, must move the tool and its attached table each time the tool is to be used.

Tables have been devised with wheels mounted on their legs to enable the tables to be moved more easily. Generally, these wheels may be lowered to allow them to engage the floor so that the table can be moved about on the wheels and these wheels may also be lifted to allow the wheels to disengage from the floor so that the table again rests securely on its four legs.

One disadvantage of these types of wheeled tables is that each wheel must be independently engaged or disengaged and this generally requires the user to stoop over repeatedly to accomplish this task. The present invention eliminates the need for the user to stoop over in order to engage or disengage wheels. The wheels of the present invention automatically engage as the user lifts up on handles provided on the device and also disengage automatically when the user releases the handles.

Another disadvantage of traditional wheeled tables is that each leg is provided with a wheel, thus making it difficult to control the movement of the device, particularly when the device is resting on an uneven or a sloped surface. The present invention is designed to be moved employing only two wheels, thus allowing the user to more easily control the movement of the device.

A final disadvantage of traditional wheeled tables is that once they have been moved, in order to relevel the legs, the user must stoop down to each of the legs to relevel them. Generally the leg is releveled by the user, employing a wrench to turn the screw-mounted leg, thereby raising or lowering the leg, depending on the direction the leg is turned with the wrench. The present invention solves this problem by providing means for adjusting the leg height which can be employed by the user while the user is in a standing position.

SUMMARY OF THE INVENTION

The present invention is a carriage table provided with left and right front and rear legs. Each leg has a lower end and an upper end. A horizontal upper portion of the table attaches to the upper ends of the legs.

The upper portion is provided with openings through which bolts insert in order to secure a tool to the table.

Left and right supporting members are provided at the lower end of the legs, extending respectively between the left front and rear legs and between the right front and rear legs. A pivot point is provided on each of the left and right supporting members approximately one-third the distance between the front and rear legs and closer to the front legs than to the rear legs. Pivot point openings are provided at each pivot point and a rod extends therethrough, and is rotatably secured therein by fastening devices attaching to each of the rod's two ends.

Left and right arms pivotally secure to said rod so that a lower end of each arm extends at an angle forward and downward from said rod and an upper end of each arm extends at an angle rearward and upward from said rod. Left and right wheels are rotatably provided on an axle which secures to and between the lower ends of the arms. One end of a left arm extension is telescopically received in the upper end of its corresponding left arm. Likewise, one end of a right arm extension is telescopically received in the upper end of its corresponding right arm. The other end of each left and right arm extension is provided with a vertical portion which extends upward and is provided with a folding handle on its upper end.

A horizontal stop member extends between the left and right rear legs near the upper ends of the legs. The arm extensions removably engage the horizontal stop member as a user lifts upward on the handles, thereby causing the wheels to engage a supporting surface and raising the legs off the supporting surface.

By lowering the handles downward, the table again comes to rest upon the supporting surface by means of leg supports provided at a lower end of each leg. Each of the leg supports is attached to a lower end of its associated height adjusting rod. A threaded opening is provided in the lower end of each leg. Each threaded opening is engaged by the threaded lower end of its associated height adjusting rod. An upper end of each height adjusting rod is movably secured to the upper end of its associated leg by means of a bracket and is provided with a height adjusting handle for turning its height adjusting rod. By turning the height adjusting rod, the relative heights of the legs can be adjusted in order to level the table, even when the table is resting on an uneven supporting surface.

Optionally, braces may be provided extending between the front legs, between the rear legs, between the left front and rear legs and between the right front and rear legs. These braces are provided to hold the table square and to strengthen it.

DETAILED DESCRIPTION OF THE PREFERRED EMBODIMENT

Figure 1:
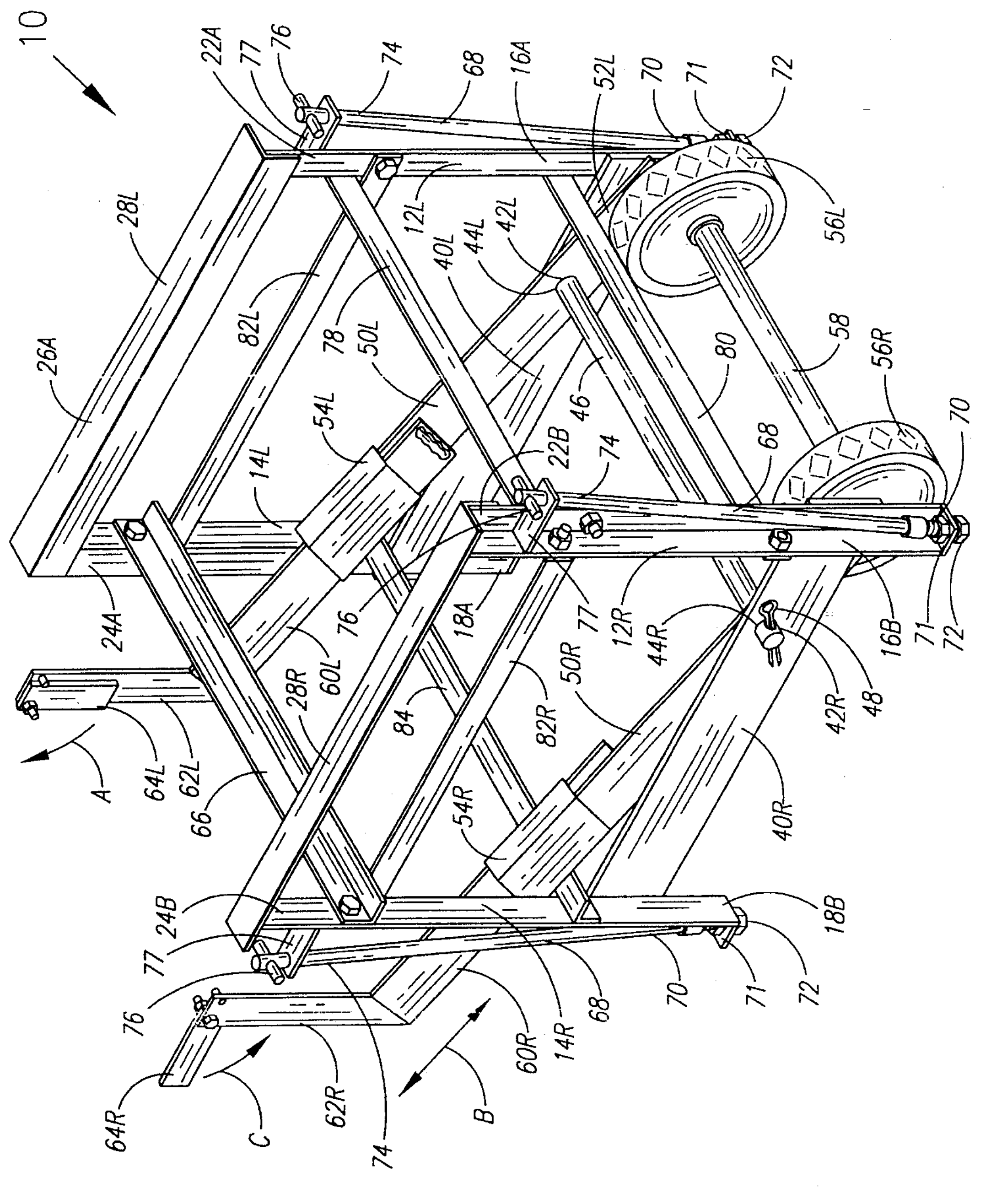
FIG. 1 is a perspective view of a carriage table constructed according to a preferred embodiment of the present invention.
Figure 3:
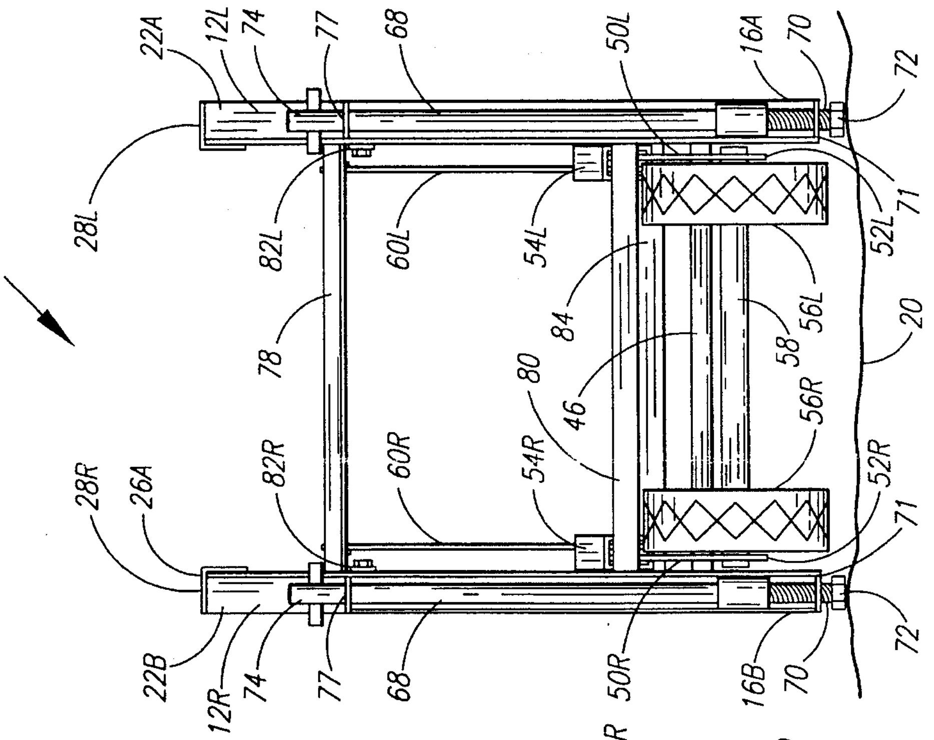
FIG. 3 is a front elevation of the carriage table.

Referring now to the drawings, and initially to FIG. 1, there is illustrated a carriage table 10 constructed according to a preferred embodiment of the present invention. The table 10 is provided with four legs; a left front leg 12L, a right front leg 12R, a left rear leg 14L and a right rear leg 14R. Lower ends 16A and 16B of the left and right front legs 12L and 12R and lower ends 18A and 18B of the left and right rear legs 14L and 14R, are oriented downward toward a supporting surface 20. Upper ends 22A and 22B of the left and right front legs 12L and 12R and upper ends 24A and 24B of the left and right rear legs 14L and 14R are oriented upward to form an upper portion either 26A, 26B, 26C, or 26D of the table 10.

A first embodiment of the upper portion, hereafter referred to as 26A and illustrated in FIGS. 1 through 4, has a left horizontal member 28L extending between the upper end 22A of the left front leg 12L and the upper end 24A of the left rear leg 141. Likewise the first embodiment 26A includes a right horizontal member 28R which attaches to and extends between the upper end 22B of the right front leg 12R and the upper end 24B of the right rear leg 14R. In this first embodiment 26A, openings 30A may optionally be provided in the left and right horizontal members 28L and 28R through which bolts 32 may insert in order to secure a tool 34 to the table 10.

Figure 5:
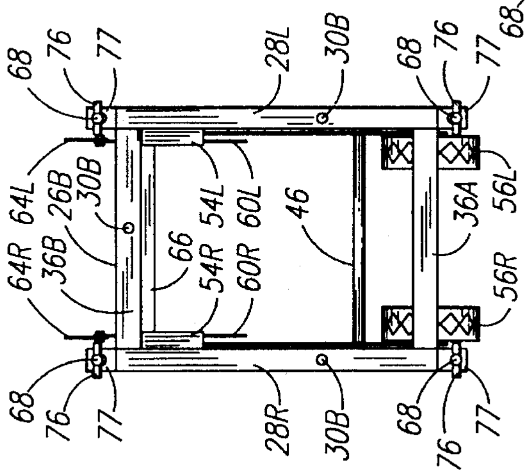
FIG. 5 is a top plan of the carriage table showing a second embodiment of the upper portion.
Figure 4:
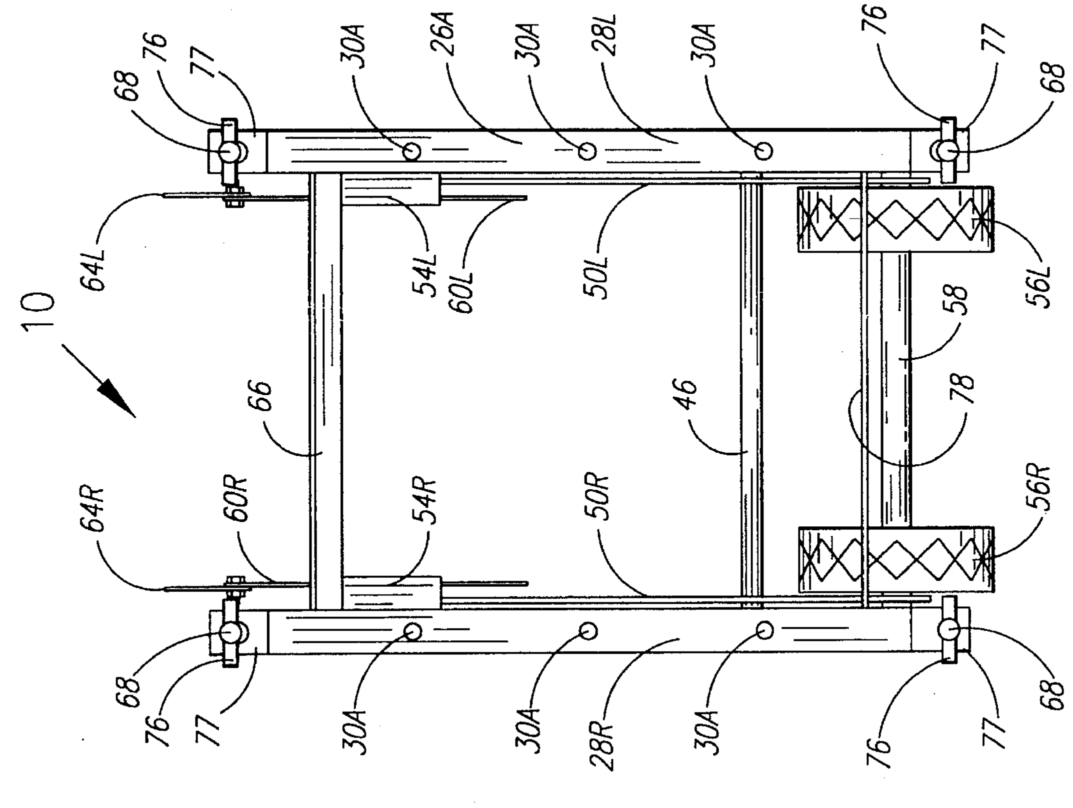
FIG. 4 is a top plan of the carriage table showing a first embodiment of an upper portion of the carriage table.

A second embodiment of the upper portion 26B illustrated in FIG. 5 is identical to the first embodiment 26A illustrated in FIGS. 1 through 4 except that it includes, in addition to the left and right horizontal members 28L and 28R, a front horizontal member 36A which attaches to and extends between the upper ends 22A and 22B of the left and right front legs 12L and 12R and also a rear horizontal member 36B which attaches to and extends between the upper ends 24A and 24B of the left and right rear legs 14L and 14R. Similar to the first embodiment 26A, the front and rear horizontal members 36A and 36B may be provided with openings 30B, similar to openings 30A of the first embodiment 26A, through which bolts 32 may be inserted in order to secure the tool 34 to the table 10.

Figure 6:
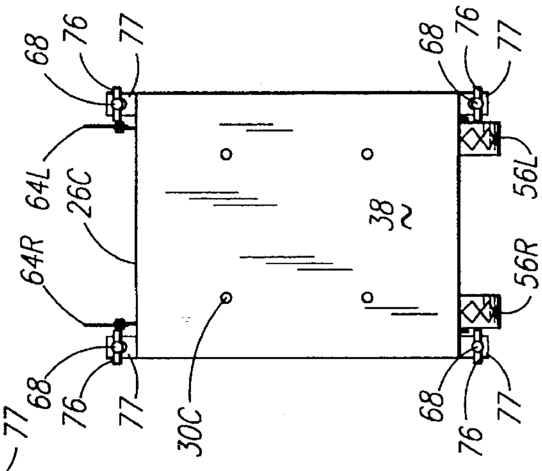
FIG. 6 is a top plan of the carriage table showing a third embodiment of the upper portion.

A third embodiment of the upper portion 26C illustrated in FIG. 6 employs a single horizontal plate 38 instead of the left, right, front and rear horizontal members 28L, 28R, 36A and 36B. In this third embodiment 26C, the horizontal plate 38 is secured to and extends between the upper ends 22A and 22B of the left and right front legs 12L and 12R and the upper ends 24A and 24B of the left and right rear legs 14L and 14R. The horizontal plate 38 is provided with openings 30C, similar to openings 30A and 30B previously described for the first and second embodiments 26A and 26B. Bolts 32 may insert into the openings 30C in order to secure the tool 34 to the table 10.

A left supporting member 40L is provided attached to and extending between the lower ends 16A and 18A of the left front and left rear legs 12L and 14L. A right supporting member 40R is provided attached to and extending between the lower ends 16B and 18B of the right front and right rear legs 12R and 14R. Each of the left and right supporting members 40L and 40R is provided with a left and right pivot point, 42L and 42R respectively. The left pivot point 42L is located between lower ends 16A and 18A and slightly closer to lower end 16A than to lower end 18A. Likewise, the right pivot point 42R is located between lower end 16B and 18B and slightly closer to lower end 16B than to lower end 18B. Each of the pivot points 42L and 42R is provided with a left or right pivot point opening, 44L and 44R respectively. A rod 46 extends between the left and right pivot points 42L and 42R. One end of the rod 46 extends through the left pivot point opening 44L and another opposite end of the rod 46 extends through the right pivot point opening 44R. The rod 46 is secured within the openings 44L and 44R by means of a fastening device 46, such as a cotter pin. Left and right arms 50L and 50R are pivotally mounted on said rod 46 so that a lower end 52L and 52R of each left and right arm 50L and 50R extends downward and forward from its respective left or right pivot point 42L and 42R, and an upper end 54L and 54R of each left and right arm 50L and 50R extends upward and rearward from its respective left or right pivot point 42L and 42R. The lower ends 52L and 52R of the left and right arms 50L and 50R are each provided with a wheel, 56L and 56R respectively, rotatably mounted on an axle 58. The axle 58 extends between the two lower ends 52L and 52R of left and right arms 50L and 50R.

The upper ends 54L of the left arm 50L telescopically receives one end of a left arm extension 60L, and the upper end 54R of the right arm 50R also telescopically receives one end of a right arm extension 60R. A second end of each arm extension 60L and 60R is provided with a vertical portion 62L and 62R which is positioned between the left and right rear legs 14L and 14R when the left and right arm extensions 60L and 60R are in their fully retracted position within the upper ends 54L and 54R of arms 50L and 50R. The vertical portions 62L and 62R extend vertically rearward of the rear legs 14L and 14R when in their fully extending position relative to the upper ends 54L and 54R of the arms 50L and 50R.

The vertical portion 62L or 62R of each arm extension 60L and 60R is provided with a folding handle 64L or 64R. The handles 64L and 64R fold downward between the vertical portions 62L and 62R for storage and may be raised to a horizontal position when in use. In use, the folding handles 64L and 64R extend rearward from the rear legs 14L and 14R.

A horizontal stop member 66 attaches to and extends between the left and right rear legs 14L and 14R at a location between the upper ends 24A and 24B of the left and right rear legs 14L and 14R and the lower ends 18A and 18B of the left and right rear legs 14L and 14R. The horizontal stop member 66 is located slightly nearer to the upper ends 24A and 24B than to the lower ends 18A and 18B.

Figure 2:
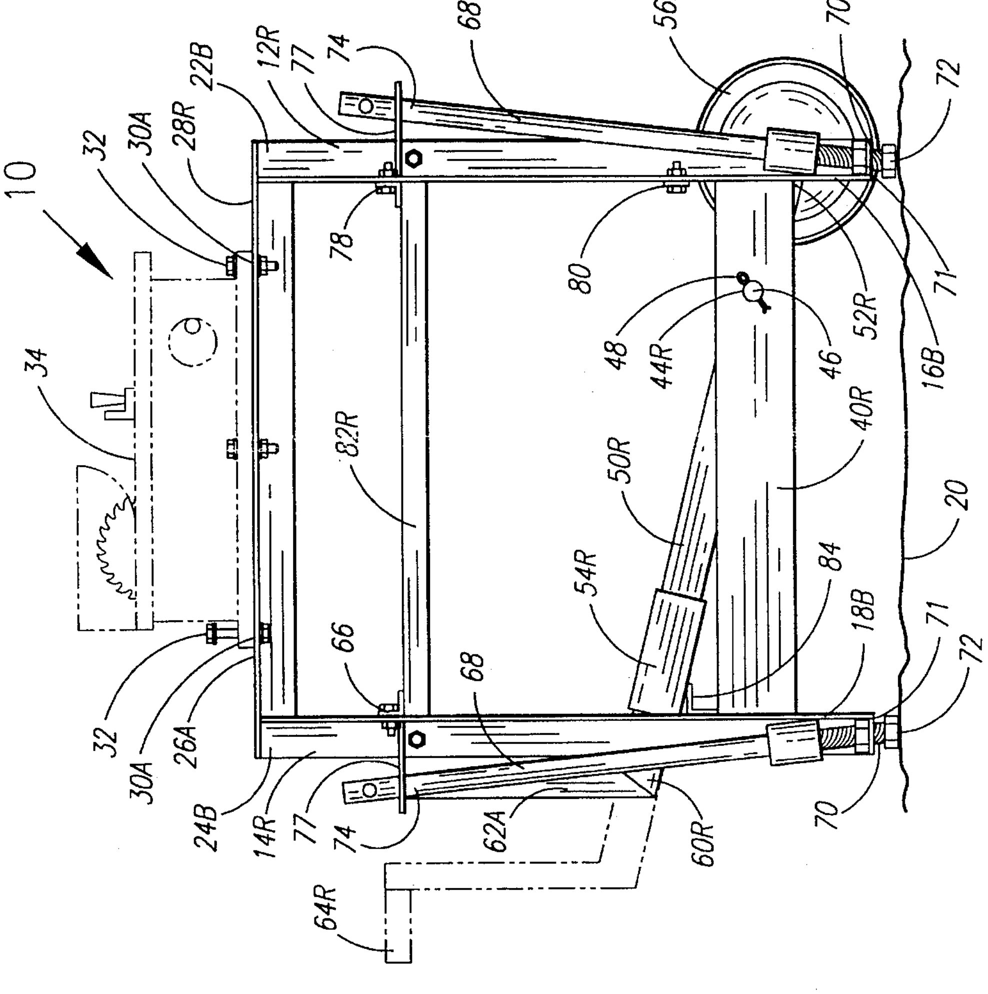
FIG. 2 is a right side elevation of the carriage table of FIG. 1.

In order to move the table 10, the folding handles 64L and 64R are grasped and swung upward to a horizontal position, as illustrated by arrows "A" in FIG. 1. The handles 64L and 64R are next pulled at an angle rearward and upward, causing the arm extensions 60L and 60R to be pulled to their fully extended position, as illustrated by arrows "B" in FIG. 1. The handles 64L and 64R are then lifted slightly upward, forcing the arms 50L and 50R to pivot at pivot points 42L and 42R and causing the wheels 56L and 56R to contact the supporting surface 20, thereby raising the lower ends 16A and 16B of the front legs 12L and 12R above the supporting surface 20. In this position, the table 10 may be moved on the wheels 56L and 56R, thus dragging the lower ends 18A and 18B of the rear legs 14L and 14R. Alternately, the handles 64L and 64FI may be raised slightly higher until the arm extensions 60L and 60R encounter the horizontal stop member 66. Raising the handles 64L and 64R slightly further upward will raise the lower ends 18A and 18B of the rear legs 14L and 14R above the supporting surface 20. In this position, the table 10 is fully supported on the wheels 56L and 56R by the user and can be freely moved about on the supporting surface Lowering the handles 64L and 64R, as shown by arrow "C" in FIG. 1, will first cause the lower ends 18A and 18B of the rear legs 14L and 14R to engage supporting surface 20 and then simultaneously cause the wheels 56L and 56R to disengage the supporting surface 20 as the lower ends 16A and 16B of the front legs 12L and 12R engage the supporting surface 20. The handles 64L and 64R may then be grasped and pushed at an angle forward and downward, causing the arm extensions 60L and 60R to be telescopically received into the upper ends 54L and 54R of the arms 50L and 50R. The arm extensions 60L and 60R will finally reach their fully retracted position within the upper ends 54L and 54R of the arms 50L and 50R as illustrated in FIG. 2. The handles 54L and 54R may be folded downward for storage, as illustrated in FIG. 1.

If the supporting surface 20 onto which the table 10 is relocated is uneven, it may be necessary to adjust the height of the legs 12L, 12R, 14L and 14R in order for the table 10 to sit level. In order to facilitate adjustment of leg height, each leg 12L, 12R, 14L and 14R is provided with a height adjusting rod 68 extending upward from the lower ends 16A, 16B, 18A and 18B of the legs 12L, 12R, 14L and 14R. A threaded lower end 70 of each height adjusting rod 68 is provided with threads which engage a threaded opening 71 provided on each of the lower ends 16A, 16B, 18A and 18B of the legs 12L, 12R, 14L and 14R so that each of the threaded lower ends 70 extends through its associated threaded opening 71. Each lower end 70 is provided with a leg support 72 which serves as the portion of each leg 12L, 12R, 14L and 14R which rests against the supporting surface 20 and thereby supports the table 10 by means of each of the legs 12L, 12R, 14L and 14R on the supporting surface 20. The legs 12L, 12R, 14L and 14R may be, by means of the height adjusting rod 68, adjusted in height relative to the supporting surface 20. The opposite end 74 of each height adjusting rod 68 is provided with a height adjusting handle 76. By turning the height adjusting handle 76, the effective length of each leg 12L, 12R, 14L and 14R may be increased or decreased depending on the direction in which the handles 76 are rotated, thus allowing the table 10 to be leveled despite the fact that the supporting surface 20 on which the table 10 rests is not even or level. The opposite end 74 of each height adjusting rod 68 is movably attached to its respective leg 12L, 12R, 14L and 14R by means of a bracket 77.

Optionally, the table 10 may be provided with upper and lower front brace members 78 and 80 extending respectively between the upper ends 22A and 22B and between the lower ends 16A and 16B of front legs 12L and 12R. Also, optionally, left and right side brace members 82L and 82R may be provided extending respectively between the upper end 22A of left leg 12L and the upper end 24A of left rear leg 14L and between the upper end 22B of right leg 12R and the upper end 24B of right rear leg 14R. Also, optionally, a rear brace member 84 may be provided extending between the lower ends 18A and 18B of rear legs 14L and 14R. The purpose of the braces 78, 80, 82L, 82R and 84 is to hold the table 10 rigid and to make the table 10 strong enough to hold a heavy tool 34.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A carriage table for mounting a tool comprising:

an upper portion supported on two front and two rear legs, at least one arm pivotally mounted to a supporting member, said supporting member interconnected between said front and rear legs so a lower end of each at least one arm extends downward and between the two front legs and an upper end extends upward and toward the rear legs, a wheel rotatably carried on the lower end of each said at least one arm, said at least one arm pivotally mounted intermediate said wheel carrying lower end and said upper end, a means for lifting being provided on the upper end of each said at least one arm so that each said at least one arm pivots when each said means for lifting is raised upward in order to cause an associated wheel to be lowered and to raise the front legs off a supporting surface, and a stop member being provided attached to at least one of said rear legs so that each means for lifting engages said stop member as the means for lifting is raised upward in order to raise the rear legs off the supporting surface.

2. A carriage table according to claim 1 wherein two arms are each pivotally mounted to a respective supporting member.

3. A carriage table according to claim 1 wherein said upper portion is provided with openings for securing a tool thereto.

4. A carriage table according to claim 1 wherein said means for lifting further comprises: said upper end of each said at least one arm telescopically receiving a first end of an arm extension, and an opposite second end of each said arm extension being provided with a handle.

5. A carriage table according to claim 4 further comprising said handles being pivotally attached to said arm extensions so that said handles may pivot downward when not in use.

6. A carriage table according to claim 5 further comprising each said second end of each said arm extension being provided with a vertical portion.

7. A carriage table according to claim 1 further comprising:

a height adjusting rod being associated with each leg, each height adjusting rod being provided with a lower threaded end rotatably engagable with a threaded opening provided in the lower end of each leg, a height adjusting handle being provided on the upper end of each height adjusting rod as a means to rotate each height adjusting rod, and a leg support being provided on each lower threaded end such that the leg supports hold the legs above the supporting surface.

8. A carriage table according to claim 7 further comprising each of said upper ends of said height adjusting handles being rotatably secured to an upper end of an associated leg by means of a bracket.

9. A carriage table for mounting a woodworking tool comprising:

an upper portion supported on front and rear legs, a pair of arms pivotally mounted to supporting members, said supporting members interconnected between said front and rear legs, a lower end of each arm extending downward toward a front end of the table and an upper end of each arm extending upward toward a rear end of the table, a wheel being rotatably carried on said lower end of each said arm, said pair of arms pivotally mounted intermediate said wheel carrying lower end and said upper end, each said upper end of said arms telescopically receiving a first end of an arm extension, a handle being provided on an opposite second end of each arm extension, a stop member being provided attached to at least one leg so that each arm extension contacts said stop member as the handles are raised upward.

10. A carriage table according to claim 9 further comprising:

said upper portion being provided with openings by which a tool secures to the upper portion.

11. A carriage table according to claim 9 wherein said handles are pivotally attached to said arm extensions so that the handles pivot downward when not in use and pivot upward when in use.

12. A carriage table according to claim 9 further comprising each leg being provided with means for adjusting leg height.

13. A carriage table according to claim 12 wherein each means for adjusting leg height further comprises:

a height adjusting rod having an upper end and a threaded lower end, said upper end of said height adjusting rod being provided with a height adjusting handle and being rotatably secured to an upper end of an associated leg by means of a bracket, said threaded lower end being engaged with and extending through a mating threaded opening provided on a lower end of the associated leg, and a leg support provided on said threaded lower end engagable with a supporting surface in order to hold the associated leg above said supporting surface.

14. A carriage table according to claim 9 further comprising braces attached between the legs to strengthen the table.

15. A carriage table according to claim 9 further comprising an axle between the lower ends of the two arms, and said wheels being rotatably mounted on said axle.

16. A carriage table according to claim 9 further comprising a pivot point provided on each supporting member, a rod being provided with two rod ends, each said rod end being rotatably secured to one of said pivot points, and each of said arms attached to said rod.

17. A carriage table according to claim 9 further comprising a vertical portion being provided on each said opposite second end of each arm extension so that each said handle pivotally attaches to an associated vertical portion.

* * * * *